United States Patent [19]

Park

[11] Patent Number: 5,758,312
[45] Date of Patent: May 26, 1998

[54] APPARATUS FOR ELIMINATING NOISES ACCOMPANYING THE KNOCKING SIGNAL OF AN AUTOMOBILE ENGINE

[75] Inventor: Kyung-Hyuk Park, Seoul, Rep. of Korea

[73] Assignee: Hyundai Motor Company, Seoul, Rep. of Korea

[21] Appl. No.: 502,006

[22] Filed: Jul. 13, 1995

[30] Foreign Application Priority Data

Jul. 14, 1994 [KR] Rep. of Korea ............ 1994-16951

[51] Int. Cl.[6] ............ G06G 7/70; G01L 23/22
[52] U.S. Cl. ............ 701/111; 364/508; 73/35.03; 73/35.04; 73/35.09; 123/425; 123/416; 123/424
[58] Field of Search ............ 364/431.03, 431.04, 364/431.051, 431.09, 431.08, 508; 123/425, 435, 422, 427; 73/35.05, 35.08, 35.04, 35.09, 35.11, 35.03, 116

[56] References Cited

U.S. PATENT DOCUMENTS

| | | | |
|---|---|---|---|
| 4,163,385 | 8/1979 | Kato et al. ............ | 73/35.03 |
| 4,345,558 | 8/1982 | Yamaguchi et al. ............ | 123/425 |
| 4,393,837 | 7/1983 | Sugihara et al. ............ | 123/425 |
| 4,422,421 | 12/1983 | Ezoe ............ | 123/424 |
| 4,452,206 | 6/1984 | Haraguchi et al. ............ | 123/425 |
| 4,458,646 | 7/1984 | Suzuki et al. ............ | 123/425 |
| 4,513,716 | 4/1985 | Haraguchi et al. ............ | 123/425 |
| 4,676,212 | 6/1987 | Kashimura et al. ............ | 123/425 |
| 4,750,103 | 6/1988 | Abo et al. ............ | 364/431.08 |
| 4,777,920 | 10/1988 | Oshiage et al. ............ | 123/425 |
| 4,802,455 | 2/1989 | Abo ............ | 123/425 |
| 4,971,007 | 11/1990 | Gopp et al. ............ | 364/431.08 |
| 5,109,820 | 5/1992 | Iwata et al. ............ | 123/425 |
| 5,321,973 | 6/1994 | Sogawa ............ | 73/35.04 |
| 5,419,180 | 5/1995 | Yamada et al. ............ | 73/35.05 |

Primary Examiner—Jacques H. Louis-Jacques
Attorney, Agent, or Firm—Finnegan, Henderson, Farabow, Garrett & Dunner, L.L.P.

[57] ABSTRACT

A knocking control system for an engine comprising a knocking sensor for producing a knocking signal representing the extent of knocking in the engine; reference signal circuitry for producing a first reference signal representing a first value and a second reference signal representing a second value different from the first value; and circuitry, coupled to the knocking sensor and the reference signal circuitry, for controlling the knocking signal to maintain a signal level between the first and second values.

6 Claims, 4 Drawing Sheets

APPARATUS FOR ELIMINATING NOISES ACCOMPANYING THE KNOCKING SIGNAL OF AN AUTOMOBILE ENGINE

BACKGROUND OF THE INVENTION

(1) Field of the Invention

The present invention concerns an apparatus for eliminating noises accompanying the knocking signal of an automobile engine, and more particularly a means for eliminating the noises caused by the ignition from the knocking signal.

(2) Description of Related Art

The term "knocking" represents a phenomena whereby the unburnt compressed end gas far from the ignition plug in the combustion chamber of an automobile engine is ignited by the inside heated surface rapidly burnt at a time before or after the normal ignition so as to generate a pressure impact, which results in serious pressure vibrations in the combustion chamber producing a sharp metallic noise. A weak knocking may improve the ratio between the pressure of the combustion chamber and the maximum pressure at the end of the compression stroke so as to prevent wasting of the expansion working of the power stroke, thereby increasing the working efficiency, but a strong knocking causes various engine problems because the rapid increase of the pressure and temperature generates high frequency pressure waves to increase abnormal vibrations of the engine. Moreover, the temperature increase damages the pistons, piston bearings, valves, and the like, and reduces the engine power.

Hence, a knocking prevention system has been provided to delay the ignition timing according the signal from a knocking sensor in order to prevent knocking. Because the pressure of the air-fuel mixture compressed in the cylinder is the greatest at the top dead center (TDC), where the end gas is compressed to the highest degree to boost knocking, it is one of the most preferable methods to delay the ignition timing in order to prevent knocking. Conventionally, a knocking sensor is employed to detect the vibrations caused by the knocking, producing an electronic knocking signal transferred to a signal processor as shown in FIG. 1. Such a conventional apparatus can not substantially eliminate unwanted noises such as the ignition noise from the knocking signal, so that it is impossible to obtain a precise control of knocking.

SUMMARY OF THE INVENTION

It is an object of the present invention to provide an apparatus for eliminating unwanted noises such as ignition noise accompanying the knocking signal of an automobile engine.

It is another object of the present invention to provide a knocking prevention system for preventing the knocking of an automobile engine by properly delaying the ignition timing according to the signal from a knocking sensor.

According to one aspect of the present invention, as embodied and broadly described herein, a knocking control system for an engine comprises a knocking sensor for producing a knocking signal representing the extent of knocking in the engine; reference signal means for producing a first reference signal representing a first value and a second reference signal representing a second value different from the first value; and means, coupled to the knocking sensor and the reference signal means, for controlling the knocking signal to maintain a signal level between the first and second values.

According to another aspect of the present invention, a knocking control system for an engine comprises an integrating circuit for integrating a crank angle pulse signal; a signal hold circuit, coupled to said integrating circuit, for holding an integrated crank angle pulse signal for a predetermined time to sequentially produce the integrated pulse signal; a reference signal circuit, coupled to the signal hold circuit, for producing a positive half-wave reference signal and a negative half-wave reference signal from sequentially produced integrated pulse signals; a knocking sensor for sensing vibration in the engine to produce a knocking signal; a signal comparator circuit coupled to the reference signal circuit and the knocking sensor, and including a first comparator part for comparing the knocking signal with a respective one of the positive and negative half-wave reference signals and a second comparator part for comparing the knocking signal with another respective one of the positive and negative half-wave reference signals; and a signal adder circuit, coupled to the signal comparator circuit, for adding signals from the first and second comparator parts of the signal comparator circuit, whereby the signal level of said knocking signal is maintained between that of the positive and negative half-wave signals.

The present invention will now be described with reference to the drawings attached only by way of example.

DETAIL DESCRIPTION OF THE PREFERRED EMBODIMENTS

Figure 1:
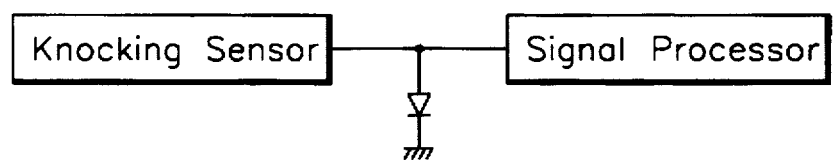
FIG. 1 is a block diagram illustrating a conventional apparatus for eliminating noises accompanying the knocking signal of an automobile engine.
Figure 2:
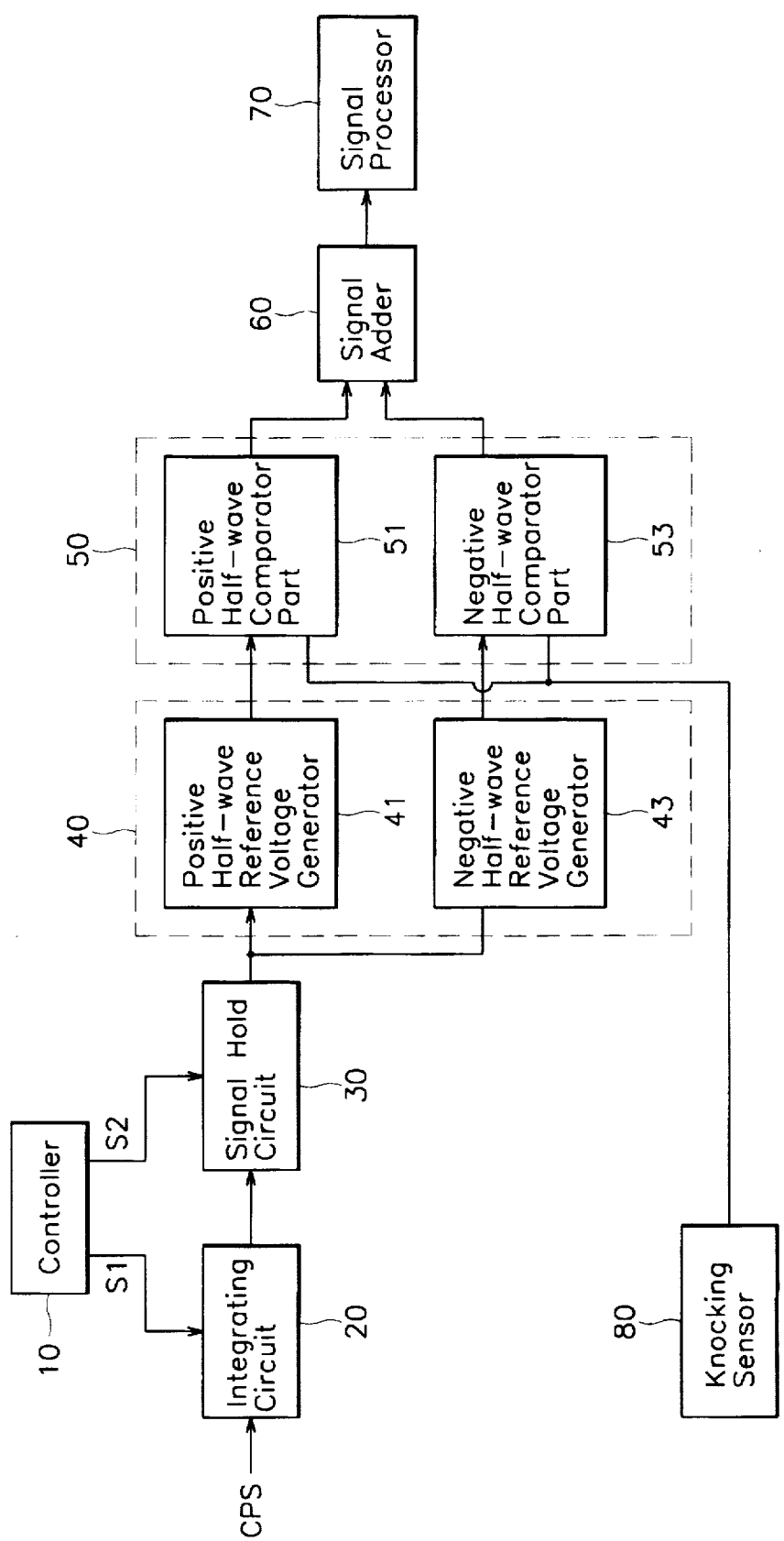
FIG. 2 is a block diagram illustrating an apparatus for eliminating noises accompanying the knocking signal of an automobile engine according to an embodiment of the present invention.

Referring to FIG. 2, according to an embodiment of the present invention, an apparatus for eliminating noises accompanying the knocking signal of an automobile engine includes an integrating circuit 20 for integrating crank angle pulse signals according to a control signal of a controller 10, a signal hold circuit 30 for holding the signals outputted from the integrating circuit 20 for a predetermined time so as to sequentially output the signals according to the control signal, and a reference voltage establishing circuit 40 for establishing a reference voltage by receiving the signals from the signal hold circuit 30. A knocking sensor 80 is provided to detect the vibrations caused by the knocking to produce an electronic knocking signal. A signal comparator circuit 50 is provided to compare the knocking signal with the reference voltage. A signal adder 60 is provided to add the signals from the signal comparator circuit 50. Finally, a signal processor is provided to process the signals from the adder 60.

Figure 3:
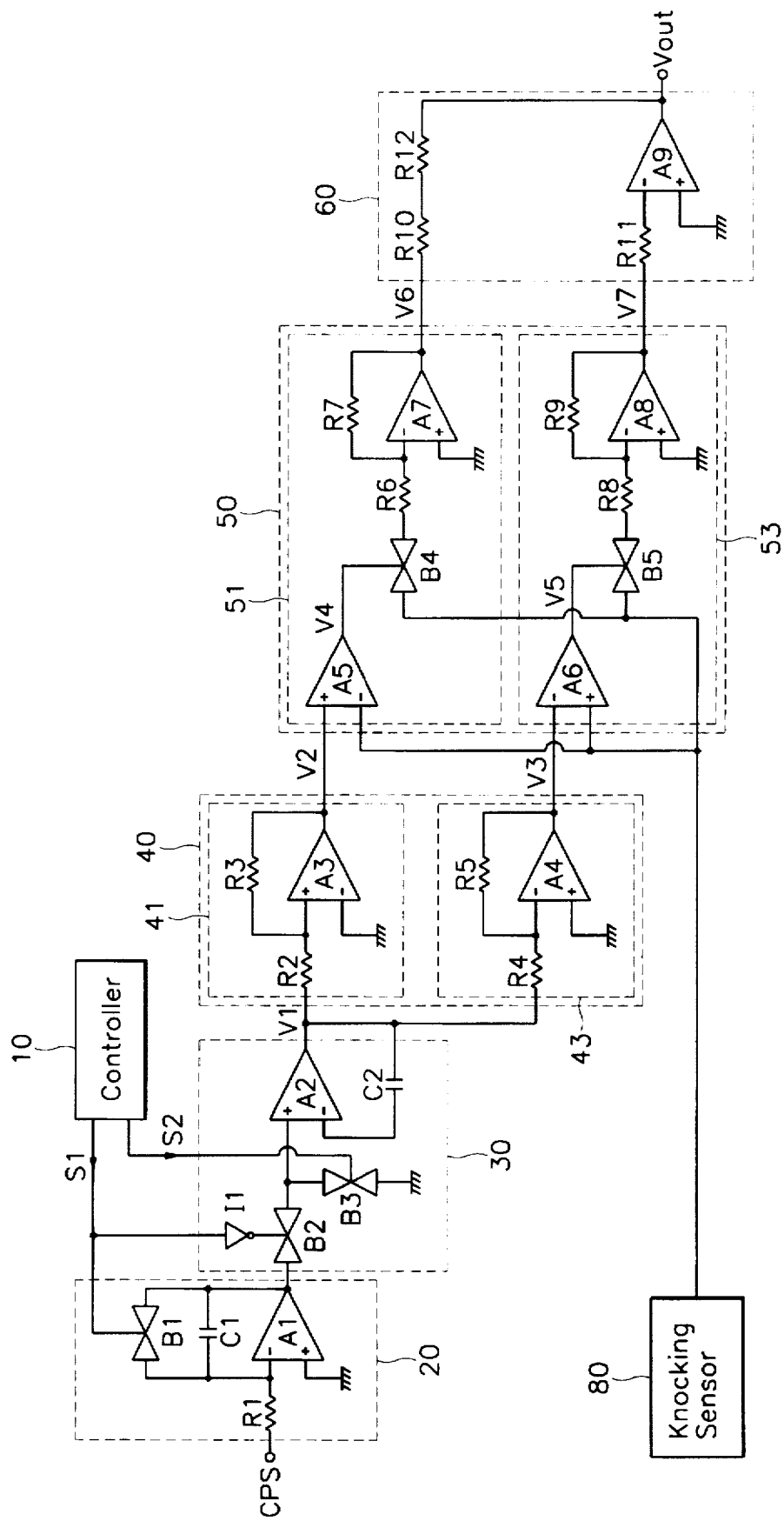
FIG. 3 is a schematic diagram illustrating the detailed circuit of FIG. 2.

More specifically describing the inventive apparatus, the integrating circuit 20 as shown in FIG. 3 includes a first operational amplifier A1 with inverting input connected to one end of a first resistor R1 and non-inverting input grounded. The other end of the first resistor R1 is connected with CPS. Also included is a first capacitor C1 with one conductor connected to the one end of the first resistor R1 and the other one to the output terminal of the first operational amplifier A1. A first analog switch B1 is provided to connect the one end of the first resistor R1 with the output terminal of the first operational amplifier A1, controlled by a first signal S1 of the controller 10.

The signal hold circuit 30 as shown in FIG. 3 includes a second operational amplifier A2 with non-inverting input connected via a second analog switch B2 to the output terminal of the first operational amplifier A1 and inverting input connected to one conductor of a second capacitor C2, the other conductor of which is connected with the output terminal of the second operational amplifier A2. The control terminal of the second analog switch B2 is connected with the output terminal of an inverter I1 whose input terminal is connected with the first signal of the controller 10. The connection line between the non-inverting terminal of the second operational amplifier A2 and the second analog switch B2 is grounded via a third analog switch B3 whose control terminal is connected with a second signal of the controller 10.

The reference voltage establishing circuit 40 as shown in FIG. 3 includes a positive half-wave reference voltage generator 41 and a negative half-wave reference voltage generator 43. The positive half-wave reference voltage generator 41 includes a third operational amplifier A3 with non-inverting input connected via a second resistor R2 to the output terminal of the second operational amplifier A2 and inverting input grounded. A third resistor R3 connects the non-inverting input of the third operational amplifier A3 with the output terminal thereof. The negative half-wave reference voltage generator 43 includes a fourth operational amplifier A4 with inverting input connected via a fourth resistor R4 to the output terminal of the second operational amplifier A2 and non-inverting input grounded. A fifth resistor R5 connects the inverting input of the fourth operational amplifier A3 with the output terminal thereof.

The signal comparator circuit 50 as shown in FIG. 3 includes a positive half-wave comparator part 51 for comparing the knocking signal with the positive half-wave reference voltage and a negative half-wave comparator part 53 for comparing the knocking signal with the negative half-wave reference voltage. The positive half-wave comparator part 51 includes a first comparator A5 with non-inverting input connected to the output terminal of the third operational amplifier A3 and inverting input connected to the output terminal of the knocking sensor 80. The output terminal of the first comparator A5 is also connected with the control terminal of a fourth analog switch B4 that is connected between the output terminal of the knocking sensor 80 and the inverting input of a fifth operational amplifier A7. One end of the fourth analog switch B4 is connected via a sixth resistor R6 to the inverting input of the fifth operational amplifier A7. The non-inverting input of the fifth operational amplifier A7 is grounded. A seventh resistor R7 connects the inverting input of the fifth operational amplifier A7 with the output terminal thereof. The negative half-wave comparator part 53 includes a second comparator A6 with inverting input connected to the output terminal of the fourth operational amplifier A4 and non-inverting input connected to the output terminal of the knocking sensor 80. The output terminal of the second comparator A6 is also connected with the control terminal of a fifth analog switch B5 that is connected between the output terminal of the knocking sensor 80 and the inverting input of a sixth operational amplifier A8. One end of the fifth analog switch B5 is connected via an eighth resistor R8 to the inverting input of the sixth operational amplifier A8. The non-inverting input of the sixth operational amplifier A8 is grounded. A ninth resistor R9 connects the inverting input of the sixth operational amplifier A8 with the output terminal thereof.

The signal adder 60 as shown in FIG. 3 includes a third comparator A9 with inverting input connected via an eleventh resistor R11 to the output terminal of the sixth operational amplifier A8 and non-inverting input grounded. The output terminal of the third comparator A9 is connected via a tenth and twelfth resistors R10 and R12 with the output terminal of the fifth operational amplifier A7.

In operation, when the ignition starts, the controller 10 is initialized to generate the first signal S1 of a low level to cause the integrating circuit 20 to integrate CPS. The first signal S1 is applied to the control terminal of the first switch B1 to turn off the switch. The first signal S1 of the low level is inverted by the inverter I1 applied to the control terminal of the second analog switch B2 to turn the switch on, so that the integrated CPS is transferred to the signal hold circuit 30. Then, the controller 10 converts the first signal S1 into a high level and the second signal S2 into a low level, so that the third analog switch B3 is turned off to transfer the integrated CPS via the second operational amplifier A2 to the reference voltage establishing circuit 40. The first and second signals S1 and S2 of the controller are the digital signals to determine the timing of integrating and holding CPS.

The signal is processed and amplified through the positive and negative half-wave reference voltage generators 41 and 43 to respectively produce a positive and negative half-wave reference voltage applied to the signal comparator circuit 50. The following equations represent the values of the output signals V2 and V3 of the third and fourth operational amplifiers A3 and A4 of the half-wave reference voltage generators 41 and 43.

$$V2=(1+R3/R2)\times V1$$

$$V3=-(R5/R4)\times V1$$

Figure 4A:
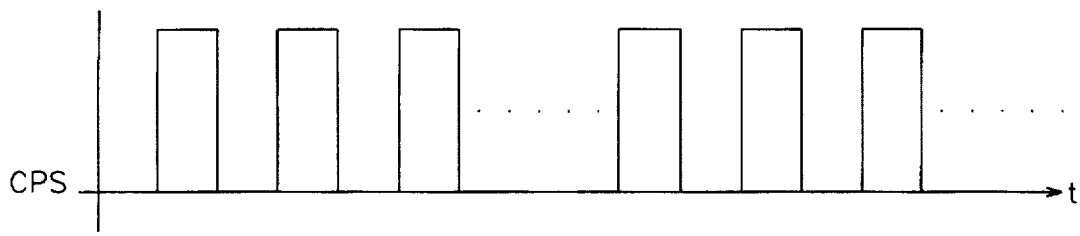
FIGS. 4A, 4B, 4C, 4D and 4E show the waveforms of the signals concerned with the inventive apparatus.
Figure 4B:
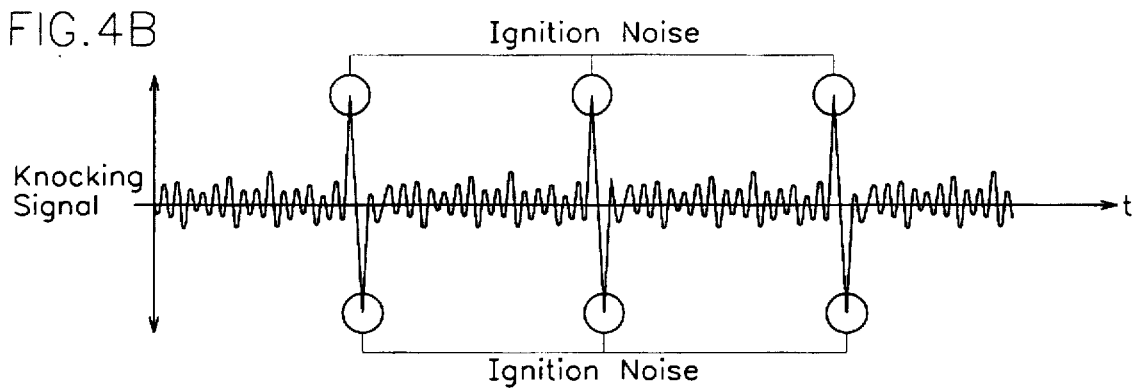

The signal comparator circuit 50 receives the signals V2 and V3 as the reference voltages respectively of the first and second comparators A5 and A6 to compare with the knocking signal, which is produced by the knocking sensor 80 containing the ignition noise as shown in FIG. 4B. The first comparator A5 generates a high signal when the value of the knocking signal of the inverting input is smaller than that of the reference voltage of the non-inverting input. On the other hand, the second comparator A6 generates a high signal when the value of the knocking signal of the non-inverting input is greater than that of the reference voltage of the inverting input.

The high signal V4 of the first comparator A5 is applied to the control terminal of the fourth analog switch B4 to turn the switch on so as to cause the knocking signal of the knocking sensor 80 to be applied via the fourth analog switch B4 to the inverting input of the fifth operational amplifier A7. Likewise, the high signal of the second comparator A6 is applied to the control terminal of the fifth analog switch B5 to turn the switch on so as to cause the knocking signal to be applied to the inverting input of the sixth operational amplifier A8. When the value of the knocking signal is greater than the reference voltage of the first comparator A5 or less than the reference voltage of the second comparator A6, the first and second comparators A5 and A6 generate low signals to turn off the analog switches B4 and B5, so that the knocking signal may not be transferred to the fifth and sixth operational amplifiers A7 and A8.

Figure 4C:
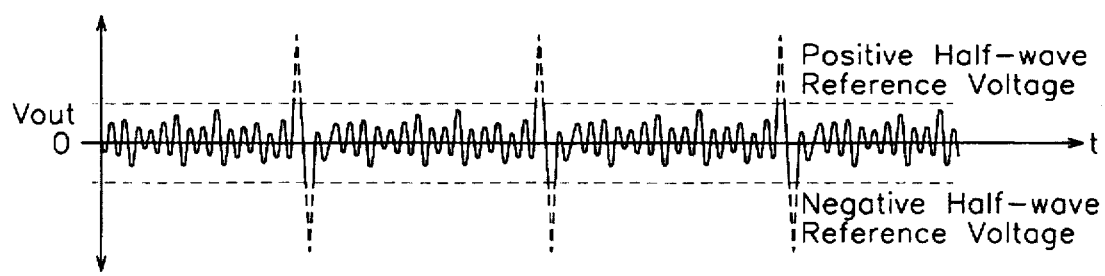
Figure 4D:
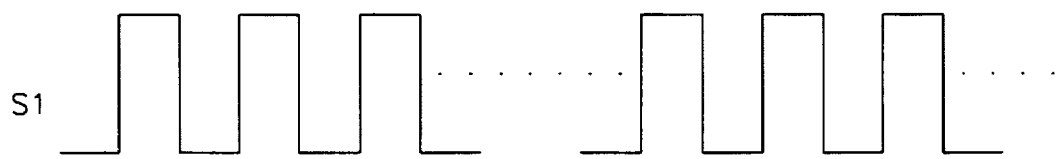
Figure 4E:

The knocking signal is amplified by the fifth and sixth operational amplifiers A7 and A8 to a given value transferred to the signal adder 60. The values of the output signals V6 and V7 of the fifth and sixth operational amplifiers A7 and A8 are as follows:

$$V6=-(R7/R6)\times Vin$$

$$V7=-(R9/R8)\times Vin$$

Wherein the symbol Vin represents the knocking signal. The signals V6 and V7 are added by the signal adder 60 to produce an output signal Vout, as shown in FIG. 4C. The value of the output signal Vout is expressed by the following equation.

$$Vout=[-(R12/R10)\times V7]+[-(R12/R11)\times V8]$$

Consequently, the knocking signals with a value between the positive half-wave reference voltage and the negative half-wave voltage are only added and transferred to the signal processor 70, so that the controller 10 controls the ignition timing according to the output signal of the signal processor.

What is claimed is:

1. A knocking control system for an engine, comprising:
    a knocking sensor for producing a knocking signal representing the extent of knocking in the engine;
    reference signal means for producing a first reference signal having a first voltage level and a second reference signal having a second voltage level different from the first voltage level; and
    means, coupled to said knocking sensor and said reference signal means, for controlling said knocking signal to maintain a signal voltage level of said knocking signal between said first and second voltage levels.

2. The knocking control system for an engine of claim 1, wherein said first reference signal is a positive half-wave signal and the second reference signal is a negative half-wave signal.

3. The knocking control system for an engine of claim 1, wherein said reference signal means includes means for producing said first and second reference signals in reference to a crank angle pulse signal.

4. The knocking control system for an engine of claim 1, wherein said controlling means includes a first compare means for comparing the signal voltage level of the knocking signal to that of said first reference signal; a second compare means for comparing the signal voltage level of the knocking signal to that of the second reference signal; and adding means for combining outputs from said first and second compare means only when the signal voltage level of the knocking signal is between that of the first and second reference signals.

5. The knocking control system for an engine of claim 1, wherein said reference signal means includes means for integrating a crank angle pulse signal; and means for holding the integrated crank angle pulse signal to sequentially produce a pair of a positive half-wave signal and a negative half-wave signal.

6. A knocking control system for an engine, comprising:
    an integrating circuit for integrating a crank angle pulse signal;
    a signal hold circuit, coupled to said integrating circuit, for holding the integrated crank angle pulse signal for a predetermined time to sequentially produce said integrated pulse signal;
    a reference signal circuit, coupled to said signal hold circuit, for producing a positive half-wave reference signal and a negative half-wave reference signal from sequentially produced integrated pulse signals;
    a knocking sensor for sensing vibration in the engine to produce a knocking signal;
    a signal comparator circuit coupled to said reference signal circuit and said knocking sensor, and including a first comparator part for comparing said knocking signal with a respective one of said positive and negative half-wave reference signals and a second comparator part for comparing said knocking signal with another respective one of said positive and negative half-wave reference signals; and
    a signal adder circuit, coupled to said signal comparator circuit, for adding signals from said first and second comparator parts of the signal comparator circuit, whereby the signal voltage level of said knocking signal is maintained between that of said positive and negative half-wave signals.

* * * * *